US012724665B2

(12) United States Patent
Dong et al.

(10) Patent No.: US 12,724,665 B2
(45) Date of Patent: Sep. 1, 2026

(54) SOFT DECODING METHOD, ELECTRONIC DEVICE, AND STORAGE MEDIUM

(71) Applicant: Zhongshan Longsys Electronics Co., Ltd., Zhongshang (CN)

(72) Inventors: Guiqiang Dong, Zhongshan (CN); Xiaoyi Zhang, Zhongshan (CN); Ao Li, Zhongshan (CN); Xichun Gao, Zhongshan (CN)

(73) Assignee: Zhongshan Longsys Electronics Co., Ltd., Zhongshan (CN)

( * ) Notice: Subject to any disclaimer, the term of this patent is extended or adjusted under 35 U.S.C. 154(b) by 49 days.

(21) Appl. No.: 18/813,072

(22) Filed: Aug. 23, 2024

(65) Prior Publication Data

US 2025/0156269 A1 May 15, 2025

(30) Foreign Application Priority Data

Nov. 15, 2023 (CN) ........................ 202311528709.4

(51) Int. Cl.
*G06F 11/10* (2006.01)

(52) U.S. Cl.
CPC ...... *G06F 11/1004* (2013.01); *G06F 11/1016* (2013.01)

(58) Field of Classification Search
CPC ............. G06F 11/1004; G06F 11/1016; G06F 11/1012; G11C 16/26; G11C 16/0483
See application file for complete search history.

(56) References Cited

U.S. PATENT DOCUMENTS 11,557,352 B2 1/2023 Chen et al.
2016/0276039 A1* 9/2016 Cai ...................... G11C 29/028
2023/0055737 A1* 2/2023 Cheng ............... H03M 13/3707
2024/0184669 A1* 6/2024 Jang .................. H03M 13/3738

* cited by examiner

*Primary Examiner* — Thien Nguyen

(57) ABSTRACT

A soft decoding method, an electronic device, and a storage medium. The soft decoding method includes: performing a hard read on a storage device and performing a hard decoding based on a read data of the hard read; determining, in response to the hard decoding being failed, a soft-decoding reference data based on the read data of the hard read; and performing a soft decoding based on soft-decoding reference data.

18 Claims, 6 Drawing Sheets

40

Buffer 0

Buffer 1

Buffer 2

Buffer 3

| | R1 | R2 | R3 | R4 | R5 | R6 | R7 | R8 |
|---|---|---|---|---|---|---|---|---|
| Buffer 0 | 1 | 1 | 1 | 0 | 0 | 0 | 0 | 0 |
| Buffer 1 | 0 | 0 | 1 | 0 | 1 | 0 | 0 | 0 |
| Buffer 2 | 1 | 1 | 0 | 0 | 0 | 0 | 0 | 0 |
| Buffer 3 | 0 | 0 | 0 | 0 | 0 | 0 | 0 | 0 |

FIG. 5

SOFT DECODING METHOD, ELECTRONIC DEVICE, AND STORAGE MEDIUM

CROSS REFERENCE TO RELATED APPLICATIONS

The present disclosure claims priority to Chinese patent application No. 202311528709.4 filed on Nov. 15, 2023, the entire contents of which are incorporated herein by reference.

TECHNICAL FIELD

The present disclosure relates to the field of storage technologies, and in particular to a soft decoding method, an electronic device, and a storage medium.

BACKGROUND

With the further growth of social demand for storage, the use of solid state disks (SSDs) made of NAND flash memory is becoming more and more popular, which brings serious challenges to the reliability and performance of flash memory.

The read process of the NAND flash memory is divided into a hard read and a soft read. The hard read is a necessary process to read a page. Only one inductive voltage is applied in each region that needs to be applied an inductive voltage. In case the hard read is failed, the soft read is implemented. That is, more voltages are gradually applied in each inductive region to obtain more accurate information, until decoding is finally successful.

However, the overall process above may trigger a long read delay, reducing the read efficiency of a storage device.

SUMMARY OF THE DISCLOSURE

In order to solve the problem, the present disclosure provides a soft decoding method, including: performing a hard read on a storage device and performing a hard decoding based on a read data of the hard read; determining, in response to the hard decoding being failed, a soft-decoding reference data based on the read data of the hard read; and performing a soft decoding based on the soft-decoding reference data.

In order to solve the problem, the present disclosure also provides an electronic device including a storage and a processor coupled to each other. The processor is configured to execute a program instruction stored in the storage to realize a soft decoding method according to any one of embodiments above.

In order to solve the problem, the present disclosure further provides a computer-readable storage medium configured to store a program instruction. The program instruction is executed by a processor to realize a soft decoding method according to any one of embodiments above.

BRIEF DESCRIPTION OF THE DRAWINGS

FIG. 5 is a schematic diagram of a counting result of counter buffer group according to an embodiment of the present disclosure.

DETAILED DESCRIPTION

The solutions in the embodiments of the present disclosure are described in detail below in conjunction with the accompanying drawings.

In the following description, specific details such as specific system structures, interfaces, technologies, etc. are provided for the purpose of explanation but not limitation, so as to provide a thorough understanding of the present disclosure.

The terms "system" and "network" are often used interchangeably in the description. The term "and/or" in the description is only represent an association relationship of associated objects, indicating that there may be three kinds of relationships. For example, A and/or B, which may indicate that there are three cases: A alone, A and B at the same time, and B alone. In addition, the character "/" in the description generally indicates that a relationship between preceding and following objects is an "or". In addition, the term "many" in the description means two or more than two.

Figure 1:
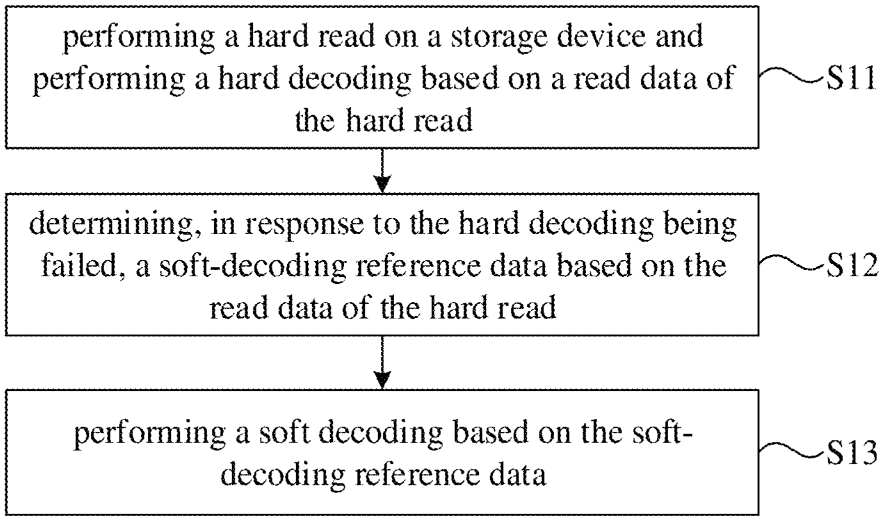
FIG. 1 is a schematic flow chart of a soft decoding method according to an embodiment of the present disclosure.

As shown in FIG. 1, FIG. 1 is a schematic flow chart of a soft decoding method according to an embodiment of the present disclosure. The soft decoding method in some embodiments may include operations executed by the following blocks.

At block S11, a hard read is performed on a storage device and a hard decoding is performed based on a read data of the hard read.

A storage of the storage device in some embodiments may include various types of Nand Flash non-volatile memory, such as a single-level cell (SLC), a multi-level cell (MLC), a triple-level cell (TLC), a quad-level cell (QLC), a Nand Flash with a single cell having a larger storage capacity in the future, and etc., which are not limited herein.

The hard read is a necessary process for reading a page, applying only one induced voltage to a region where the induced voltage needs to be applied in order to read. Wherein, the hard read in some embodiments refers to a read operation in which a read data is hard decoded after a read operation. That is, in case the read data is hard decoded after a read, the read is a hard read. In case the read data is soft decoded after a read, the read is a soft read. The hard decoding is a binary code word that is read directly using a read voltage, and there are only two code words for decoding, i.e., 0 and 1.

At block S12, in response to the hard decoding being failed, a soft-decoding reference data is determined based on the read data of the hard read.

The soft-decoding reference data in some embodiments refers to a reference standard for soft decoding, is configured for estimating whether a data is valid or invalid to determine whether a decoding is successful or failed, and is not an original data of soft decoding. The soft-decoding reference data may include, but is not limited to a voltage parameter in the read data obtained by the hard read, a log-likelihood ratio generated based on the read data of the hard read, or other soft-decoding reference parameters. The log-likelihood ratio is an index reflecting authenticity, belongs to a composite index reflecting both sensitivity and specificity, and refers to a logarithm of a ratio of likelihood functions of two probability distributions.

In response to the hard decoding being failed, the soft-decoding reference data is directly determined based on the read data of the hard read originally intended to be deprecated in some embodiments, such that an utilization rate of the read data of the hard read is enabled to be improved, thereby improving a success probability of soft decoding directly by the hard read without the soft read, reducing a read delay, and improving a read efficiency of the storage device.

In response to the hard decoding being successful, the storage device is read successfully, and no further operations are required.

At block S13, a soft decoding is performed based on the soft-decoding reference data.

The soft decoding may be performed using a low-density parity check (LDPC) code or other check codes.

In some embodiments, after the soft-decoding reference data is determined, the read data of the hard read may be soft decoded based on the soft-decoding reference data. Alternatively, a new hard read may performed on the storage device again, and a read data of the new hard read may be soft decoded based on the soft-decoding reference data. A raw data targeted by the soft decoding is not limited herein.

Because the soft-decoding reference data in the embodiments is generated based on information generated in a hard read process, the soft decoding may be realized successfully without triggering the soft read, thereby improving the utilization rate of the read data of the hard read, avoiding the soft read, reducing the read delay, and improving the read efficiency of the storage device.

Through the operations above, the soft decoding method in the embodiments performs the hard read on the storage device and performs the hard decoding based on the read data of the hard read. In response to the hard decoding being failed, the soft-decoding reference data is determined based on the read data of the hard read. The soft decoding is performed based on the soft-decoding reference data. The soft-decoding reference data may be generated based on the information generated in the hard read process, and the soft decoding may be performed based on the soft-decoding reference data. In this way, the soft decoding may be realized successfully without triggering the soft read, thereby improving the utilization rate of the read data of the hard read, avoiding the soft read, reducing the read delay, and improving the read efficiency of the storage device.

Figure 2:
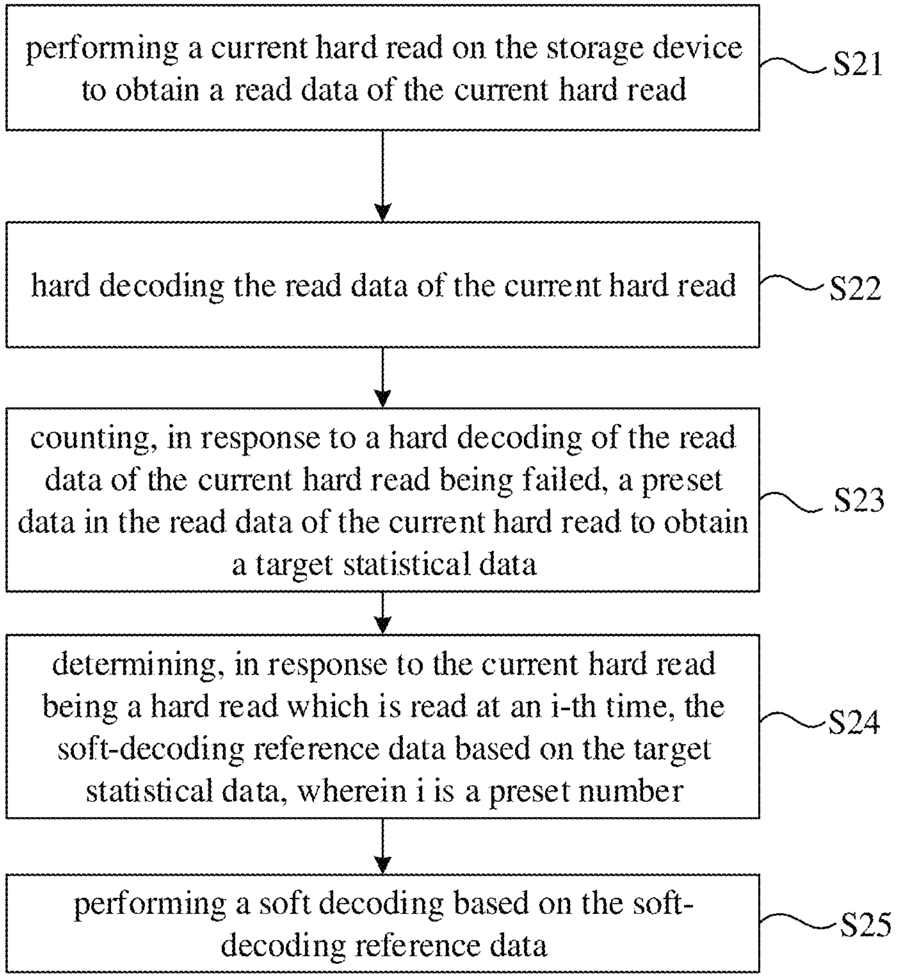
FIG. 2 is a schematic flow chart of a soft decoding method according to another embodiment of the present disclosure.

As shown in FIG. 2, FIG. 2 is a schematic flow chart of a soft decoding method according to another embodiment of the present disclosure. The soft decoding method in some embodiments may include operations executed by the following blocks.

At block S21, a current hard read is performed on the storage device to obtain a read data of the current hard read.

In a read recovery stage of the storage device, the hard read is performed on a data of the storage. In some embodiments, a default read (i.e., an initial hard read) is performed first. In response to the default read being failed, a read retry stage is entered. Multiple hard reads and multiple hard decodings are performed correspondingly in the read retry stage. The read voltage of each hard read is different, so as to try to hit an optimal read voltage to improve a read success rate of the read voltage.

The current hard read in some embodiments may be any one of a hard read in the default read or the read retry.

At block S22, the read data of the current hard read is hard decoded.

The hard decoding is a binary code word that is read directly using a read voltage, and there are only two code words for decoding, i.e., 0 and 1.

At block S23, in response to a hard decoding of the read data of the current hard read being failed, a preset data in the read data of the current hard read is counted to obtain a target statistical data.

After each hard decoding is failed, the preset data in the read data of the current hard read may be updated and counted to obtain a corresponding target statistical data. In response to the hard decoding being successful, the storage device is read successfully, and no further operations are required.

In some embodiments, the preset data in the read data of the current hard read is counted to obtain a current statistical data, and the current statistical data is counted into a historical statistical data to obtain the target statistical data. The historical statistical data is a comprehensive statistical data of a read data of a historical hard read. The historical hard read is a hard read performed on the storage device before the current hard read.

That is, the target statistical data is a combination of a statistical data of the current hard read and a statistical data of the historical hard read.

A counting method of the preset data is as follows. Before performing the hard read, a total number of times of hard read and a read voltage of each hard read are set. A voltage of the storage device is divided into multiple regions based on the read voltage of each hard read. The total number of times of hard read refers to a total number of times of all hard reads in the default read and the read retry. The total number of times is set based on actual demands. The read voltage of each hard read may be set based on a reference voltage and a deviation value. Alternatively, the read voltage of each hard read may be set based on experience, and the total number of times of hard read and the read voltage of each hard read are not limited herein.

During counting, a preset data in a corresponding read data is determined based on a read voltage of the current hard read and a preset data in each of the regions is counted to obtain the current statistical data. The current statistical data is counted into the historical statistical data to obtain the target statistical data. The historical statistical data is a statistical data of the preset data in each of the regions of the read data of the historical hard read.

Figures 3, 4:
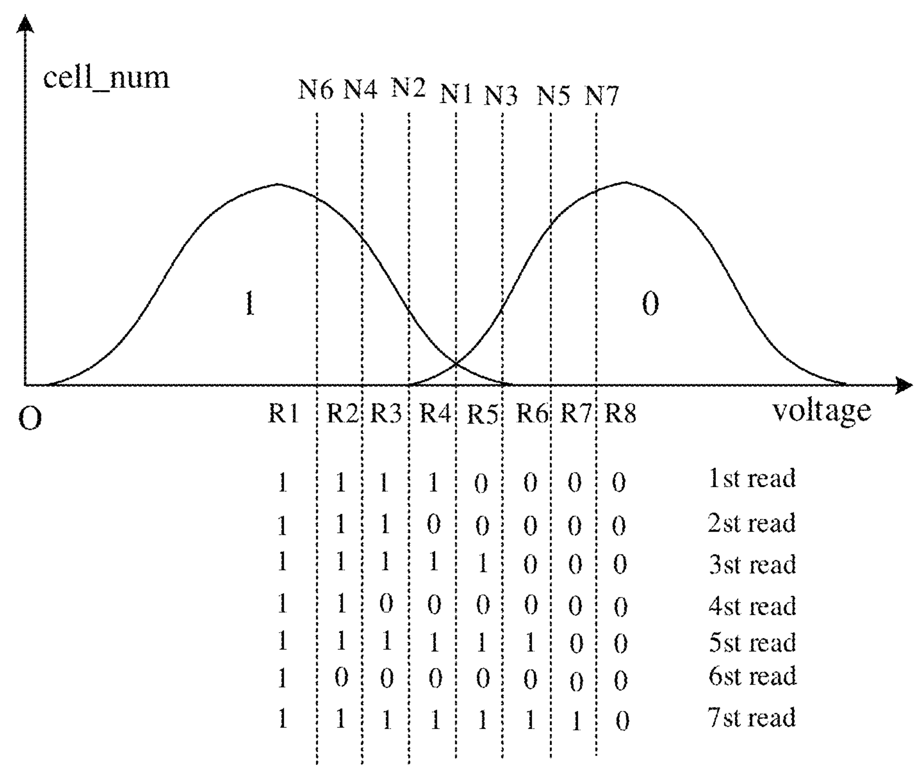
FIG. 3 is a schematic diagram of a plurality of regions of a storage device divided by voltages according to an embodiment of the present disclosure.
FIG. 4 is a schematic structural view of a counter buffer group according to an embodiment of the present disclosure.

As shown in FIG. 3, FIG. 3 is a schematic diagram of a plurality of regions of a storage device divided by voltages according to an embodiment of the present disclosure.

In some embodiments, the total number of times of hard read in the default read and the read retry includes 7 times, which may as an example described below. In other embodiments, the default read and the read retry may also include other total number of times of hard read, such as 3 times, 5 times, 10 times, 15 times, or 21 times.

The read voltage is different for each hard read, and the voltage of the storage device is divided into multiple regions. The read voltages corresponding to 7 times of hard reads in the embodiments include a first read voltage N1, a second read voltage N2, a third read voltage N3, a fourth read voltage N4, a fifth read voltage N5, a sixth read voltage N6, and a seventh read voltage N7. The 7 read voltages divide the voltage of the storage device into 8 regions, including a first region R1, a second region R2, a third region R3, a fourth region R4, a fifth region R5, a sixth region R6, a seventh region R7, and a eighth region R8.

After the hard decoding of the read data of the current hard read is failed, the preset data in the corresponding read data is determined based on the read voltage of the current hard read and the preset data in each of the regions is counted to obtain the current statistical data.

The preset data includes 1 and/or 0 or other data that may be configured to predict the soft-decoding reference data, which is not limited herein. In some embodiments, in case the preset data is 1, the 1 in the first region R1, the second region R2, the third region R3, the fourth region R4, the fifth region R5, the sixth region R6, the seventh region R7, and the eighth region R8 is counted respectively after the current hard read. In some embodiments, in case the preset data is 0, the 0 in the first region R1, the second region R2, the third region R3, the fourth region R4, the fifth region R5, the sixth region R6, the seventh region R7, and the eighth region R8 is counted respectively after the current hard read.

A method of counting the 1 and the 0 is as follows. In response to a voltage of one of the voltage regions being less than the read voltage of the current hard read, a read data corresponding to the one of the regions is determined as 1. In response to a voltage of one of the regions being greater than the read voltage of the current hard read, a read data corresponding to the one of the regions is determined as 0. An occurrence number of 1 and/or an occurrence number of 0 in each of the regions is counted to obtain the current statistical data.

In some embodiments, for a certain read voltage (e.g., sensing Vth), in response to a voltage of a region being less than the certain read voltage, a read data corresponding to the region may be determined as 1; in response to a voltage of a region being greater than the certain read voltage, a read data corresponding to the region may be determined as 0. For example, in case a read voltage of a first hard read is N1, a read data of each region whose voltage is less than N1 is determined as 1, and a read data of each region whose voltage is greater than N1 is determined as 0. In case a read voltage of a fifth hard read is N5, a read data of each region whose voltage is less than N5 is determined as 1, and a read data of each region whose voltage is greater than N5 is determined as 0. The preset data of each region of other hard reads are determined by a way the same as above, and will not be repeated herein.

In the above method, an occurrence number of the preset data of each region may be counted respectively to obtain the current statistical data based on the read data of the current hard read. In some embodiments, in case the preset data is 1 and the current hard read is a third hard read. During the third hard read, the read data of the first region R1, the second region R2, the third region R3, the fourth region R4, the fifth region R5, the sixth region R6, the seventh region R7, and the eighth region R8 are 1, 1, 1, 1, 1, 0, 0, and 0, respectively. The occurrence number of 1 in each of the first region R1, the second region R2, the third region R3, the fourth region R4, and the fifth region R5 is 1 time respectively. The occurrence number of 1 in each of the sixth region R6, the seventh region R7, and the eighth region R8 is 0 time respectively. A statistic method of the current statistical data is such as this, and will not be repeated herein.

After the current statistical data is obtained, the current statistical data is counted into the historical statistical data to obtain the target statistical data. The historical statistical data is the statistical data of the preset data in each region of the read data of the historical hard read. In some embodiments, the target statistical data is obtained by adding an occurrence number of 1 and/or an occurrence number of 0 in each region of the current hard read and an occurrence number of 1 and/or an occurrence number of 0 in each region of the historical hard read respectively.

In some embodiments, in case the occurrence number of 1 in each region of the historical hard read is 2, 2, 2, 1, 0, 0, 0, and 0, respectively. That is, the storage device has been hard read twice in history. When the current hard read is the third hard read, the occurrence number of 1 in each region of the third hard read is counted into the occurrence number of 1 in each region of the historical hard read, and the occurrence number of 1 in each region of the target statistical data is 3, 3, 3, 2, 1, 0, 0, and 0, respectively.

In some embodiments, a counter buffer group is arranged in the storage device. The counter buffer group includes a buffer unit and at least one counting unit and is configured to count the occurrence number of I/O. The buffer unit is configured to cache the read data of the current hard read, and at least one counting unit is configured to count the current statistical data and count the current statistical data into the historical statistical data to obtain the target statistical data. In some embodiment, the counting unit may include a binary counting unit, and a number of the counting unit is arranged based on the total number of times of hard read. For example, in case the total number of times of hard read is up to 7 times, the number of the counting unit may be 3; in case the total number of times of hard read is up to 15 times, the number of the counting unit may be 4, and so on. In some embodiments, the counting unit may also include a decimal counting unit, and a number of the counting unit is arranged based on the total number of times of hard read. For example, in case the total number of times of hard read is up to 9 times, the number of the counting unit may be 1; in case the total number of times of hard read is up to 99 times, the number of the counting unit may be 2, and so on.

As shown in FIG. 4, FIG. 4 is a schematic structural view of a counter buffer group according to an embodiment of the present disclosure.

In some embodiments, the counting unit is a binary counting unit and the total number of times of hard read is 7 times, which may as an example described below. The counter buffer group 40 includes a buffer unit Buffer 0 and three counting units including a first counting unit Buffer 1, a second counting unit Buffer 2, and a third counting unit Buffer 3. The first counting unit Buffer 1 corresponds to a low bit, and the third counting unit Buffer 3 corresponds to a high bit.

After the hard decoding of the current hard read is failed, the occurrence number of 1 and/or the occurrence number of 0 in each of the regions of the current hard read is overwritten into the buffer unit Buffer 0. The first counting unit Buffer 1, the second counting unit Buffer 2, and the third counting unit Buffer 3 respectively add the occurrence number of 1 and/or the occurrence number of 0 in each region of the current hard read and the occurrence number of 1 and/or the occurrence number of 0 in each region of the historical hard read based on the data in the buffer unit Buffer 0 to obtain the target statistical data.

As shown in FIG. 5, FIG. 5 is a schematic diagram of a counting result of counter buffer group according to an embodiment of the present disclosure.

In some embodiments, a second hard read shown in FIG. 3 is taken as an example. In case the preset data is 1, and the read data of each region in the second hard read, i.e., 1, 1, 1, 0, 0, 0, 0, and 0, is overwritten into the buffer unit Buffer 0.

The first counting unit Buffer 1, the second counting unit Buffer 2, and the third counting unit Buffer 3 respectively add the occurrence number of 1 in each region of the current hard read and the occurrence number of 1 in each region of the historical hard read based on the data in the buffer unit Buffer 0 to obtain the target statistical data. For example, an occurrence number of 1 in the first region R1 of the second hard read is 1 time, and an occurrence number of 1 in the first region R1 of the target statistical data is 010, which is 2 times. An occurrence number of 1 in the third region R3 of the second hard read is 1 time, and an occurrence number of 1 in the third region R3 of the target statistical data of is 001, which is 1 time, and so on, which will not be repeated herein.

In case counting the preset data is counting the occurrence number of 1, if the occurrence number of 0 are needed to be obtained, the occurrence number of 1 may subtracted from the total number of times of hard read.

A target statistical data of the current hard read and a target statistical data of the historical hard read are obtained through the statistic method above.

At block S24, in response to the current hard read being a hard read which is read at an i-th time, the soft-decoding reference data is determined based on the target statistical data. I is a preset number.

In response to the current hard read being the hard read which is read at the i-th time, the soft-decoding reference data is determined based on the target statistical data. That is, the soft-decoding reference data is estimated by an occurrence number of the preset data in each region of the read data of the hard read with a preset number of times.

The preset number of times may be set based on an actual situation, which may be one or multiple times, such as 1 time, 2 times, 3 times, 4 times, 5 times, 7 times, 8 times, 9 times, 13 times, 15 times, 21 times, and etc., which are not limited herein. In some embodiments, when the preset number of times is one time, the soft-decoding reference data may be determined based on a read data of each hard read after each hard read is failed. In some embodiments, when the preset number of times is 3 times, the soft-decoding reference data may be determined based on a read data of 3 times hard reads after 3 times hard reads are failed.

In some embodiments, a log-likelihood ratio of each region is determined based on the occurrence number of 1 and/or the occurrence number of 0 in each region in the target statistical data. The log-likelihood ratio of each region is determined as the soft-decoding reference data.

In some embodiments, the log-likelihood ratio of each region may be calculated based on an adjustment parameter, the occurrence number of 1 in each region in the target statistical data, and the occurrence number of 0 in each region in the target statistical data through a preset formula.

The preset formula is $$LLR = \text{scale} * \ln\left(\frac{C_0}{C_1}\right).$$

Where LLR is the log-likelihood ratio, scale is the adjustment parameter, $C_0$ is the occurrence number of 0, and $C_1$ is the occurrence number of 1.

In some embodiments, the occurrence number of 1 or the occurrence number of 0 in each region of the target statistical data may be mapped to a corresponding log-likelihood ratio based on a preset mapping table. The preset mapping table is established in advance based on a relationship between the occurrence number of 1 or the occurrence number of 0 and the log-likelihood ratio.

As shown in the following table, the following table is the preset mapping table in some embodiments.

| occurrence number of 1 | LLR |
|---|---|
| 0 | +15 |
| 1 | +10 |
| 2 | +5 |
| 3 | +1 |
| 4 | −1 |
| 5 | −5 |
| 6 | −10 |
| 7 | −15 |

The table above is the preset mapping table showing the preset data is 1 and the total number of times of hard reads is 7 times. A mapping relationship of the preset mapping table may be established based on experience. When the preset data is other data, or the total number of times of hard read is other times, the preset mapping table may include other relationships.

At block S25, a soft decoding is performed based on the soft-decoding reference data.

The soft decoding is performed based on the log-likelihood ratio obtained above, such that the success probability of soft decoding is enabled to be improved based on the read data of the hard read, thereby reducing the read delay and improving the read efficiency of the storage device.

In response to the current hard read being not the hard read which is read at the i-th time, a next hard read is performed on the storage device until the hard decoding is successful or the hard read which is read at the i-th time is reached. When the next hard read is performed, the target statistical data of the current hard read becomes a historical statistical data of the next hard read for updating and statistic.

Through the operations above, the soft decoding method of the embodiments may generate the soft-decoding reference data based on the information generated in the hard read process, and utilize the soft-decoding reference data to perform soft decoding. In this way, the soft decoding may be realized successfully without triggering the soft read, thereby improving the utilization rate of the read data of the hard read, reducing requirement of multiple soft reads during the soft decoding, an occupation of memory resources, read resources, and back-end transmission bandwidth resources, and the delay time, and improving the read efficiency of the storage device. The preset data of the hard read during historical statistic in some embodiments is updated in real time after each hard read, such that the log-likelihood ratio may be predicted, thereby performing the soft decoding based on the log-likelihood ratio and improving the success rate of soft decoding.

In some embodiments, the soft decoding method further includes the operations as follows. The initial hard read (i.e., the default read) is performed on the storage device and a hard decoding is performed based on a read data of the initial hard read. In response to the hard decoding being failed, at least one repeated hard read (i.e., read retry) is performed on the storage device. In response to a hard decoding of a read data of at least one repeated hard read being failed, the soft-decoding reference data is determined based on the read data of the initial hard read and the read data of the repeated hard read. A soft decoding is performed based on the soft-decoding reference data. And/or, in response to the hard decoding of the read data of at least one repeated hard read being failed, a soft read is performed on the storage device. The soft-decoding reference data is determined based on a read data of the soft read and a soft decoding is performed based on the soft-decoding reference data.

In the embodiments, an operation of determining the soft-decoding reference data based on the read data of the hard read and performing the soft decoding based on the soft-decoding reference data and an operation of determining the soft-decoding reference data through soft decoding after the repeated hard read is failed and performing the soft decoding based on the soft-decoding reference data may be parallel performed in a read operation of a same storage device, thereby further improving the success probability of soft decoding, reducing the read delay, and improving the read efficiency of the storage device.

Figure 6:
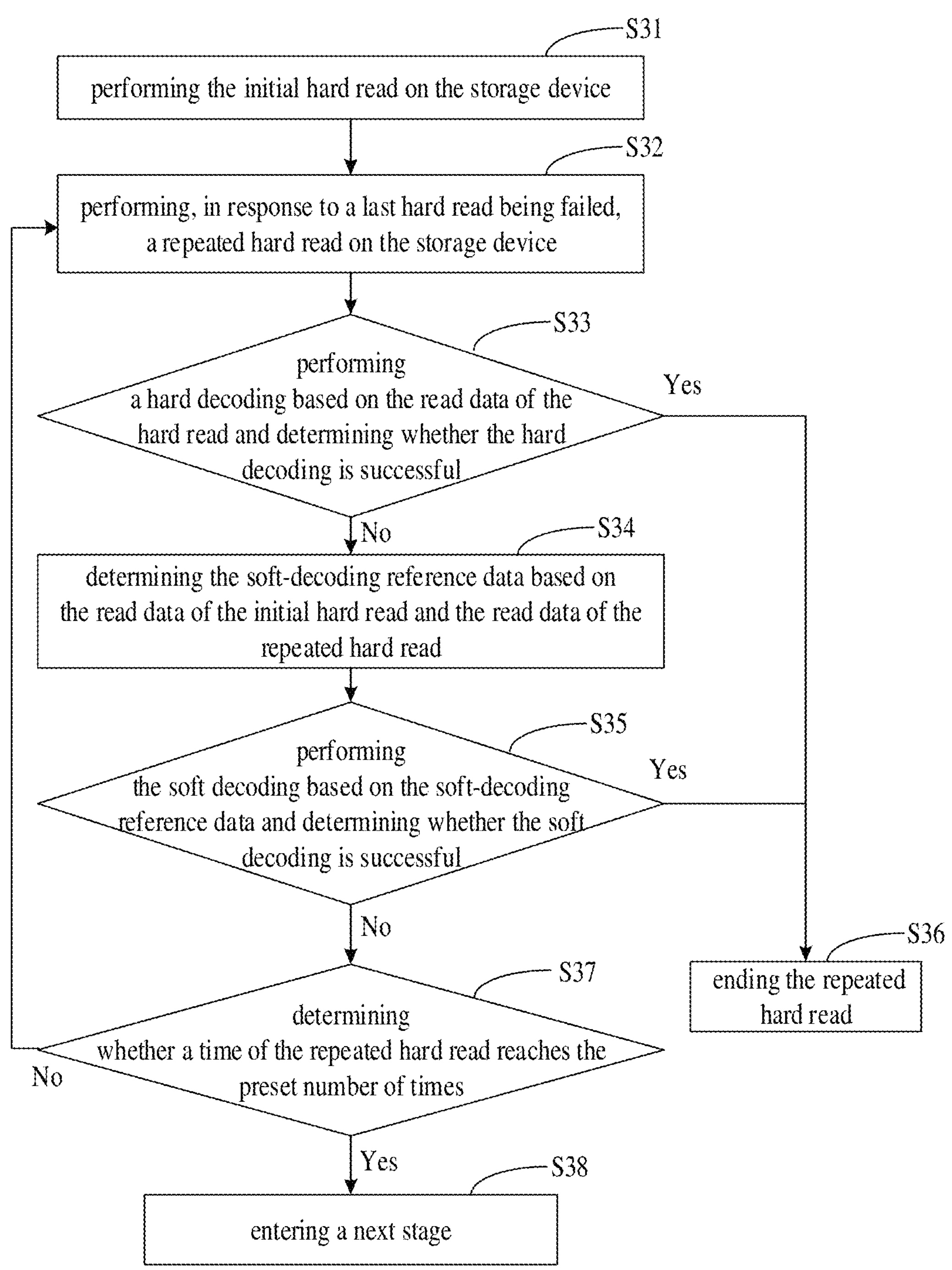
FIG. 6 is a schematic flow chart of a soft decoding method according to a further embodiment of the present disclosure.

As shown in FIG. 6, FIG. 6 is a schematic flow chart of a soft decoding method according to a further embodiment of the present disclosure. The soft decoding method in some embodiments may include operations executed by the following blocks.

At block S31, the initial hard read is performed on the storage device.

Before performing the initial hard read on the storage device, parameters are initialized. Trigger_soft_retry is set as 0, read_cnt is set as 0, and buffer_num is set as 0.

The trigger_soft_retry indicates whether the soft decoding process of a repeated read needs to be triggered. The read_cnt indicates how many times of hard read have been performed during a statistic period. The buffer_num is a number of the counting units.

In response to a solution for determining the soft-decoding reference data based on the read data of the hard read in the embodiments being started, the trigger_soft_retry is set as 1. In response to the solution above being not started, the repeated read is performed normally and the trigger_soft_retry is set as 0.

In response to the solution being started, a value of the buffer_num is set based on a preset value of retry_thre and buffer resources is allocated. When a value of the retry_thre is (0,7], the value of the buffer_num is 3. That is, a 3 bit buffer (i.e., buffer 1/2/3) is used as the counter buffer group. When a value of retry_thre is [8,15], the value of the buffer_num is 4. That is, a 4 bit buffer (i.e., buffer 1/2/3/4) is used as the counter buffer group. The retry_thre is the preset number of times.

After the parameters are set, the initial hard read is performed on the storage device.

At block S32, in response to a last hard read being failed, a repeated hard read is performed on the storage device.

At block S33, a hard decoding is performed based on the read data of the hard read and whether the hard decoding is successful or not is determined.

The hard decoding is performed after each hard read. In response to the hard decoding being successful, block S36 is executed to complete the read. In response to the hard decoding being failed, block S34 is executed.

The occurrence number of 1 in each bit is counted by the counter buffer group after each hard read, and a total number of performed reads is counted by the read_cnt.

At block S34, the soft-decoding reference data is determined based on the read data of the initial hard read and the read data of the repeated hard read.

After the hard decoding of each hard read is failed in the read retry, the LLR is estimated based on existing read information.

At block S35, the soft decoding is performed based on the soft-decoding reference data and whether the soft decoding is successful or not is determined.

In response to the soft decoding being successful, block S36 is executed. In response to the soft decoding being failed, block S37 is executed.

At block S36, the repeated hard read is ended.

At block S37, whether a time of the repeated hard read reaches the preset number of times or not is determined.

In response to the time of the repeated hard read does not reach the preset number of times, a next hard read is performed. That is, block S32 is executed. In response to the time of the repeated hard read reaches the preset number of times, block S38 is executed.

At block S38, a next stage is entered.

The next stage may include a soft read, an end read, or other means of reads, which may be set according to the actual situation.

Through the operations above, the soft decoding method of the embodiments may generate the soft-decoding reference data based on the information generated in the hard read process, and utilize the soft-decoding reference data to perform soft decoding. In this way, the soft decoding may be realized successfully without triggering the soft read, thereby improving the utilization rate of the read data of the hard read, reducing requirement of multiple soft reads during the soft decoding, an occupation of memory resources, read resources, and back-end transmission bandwidth resources, and the delay time, and improving the read efficiency of the storage device.

Figure 7:
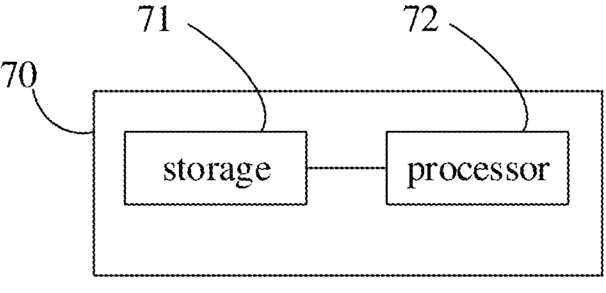
FIG. 7 is a schematic structural view of an electronic device according to an embodiment of the present disclosure.

As shown in FIG. 7, FIG. 7 is a schematic structural view of an electronic device according to an embodiment of the present disclosure. An electronic device 70 includes a storage 71 and a processor 72 coupled to each other. The processor 72 is configured to execute a program instruction stored in the storage 71 to realize the operations of the methods above. In some embodiments, the electronic device 70 may include, but is not limited to a microcomputer and a server. In addition, the electronic device 70 may also include a notebook computer, a tablet computer, a Nand Flash, and etc., which is not limited herein.

In some embodiments, the processor 72 is configured to control itself as well as the storage 71 to implement the operations of any one of the methods above. The processor 72 may also be called a central processing unit (CPU). The processor 72 may be an integrated circuit chip with signal processing capabilities. The processor 72 may also be a general-purpose processor, a digital signal processor (DSP), an application specific integrated circuit (ASIC), a field-programmable gate array (FPGA), or other programmable logic devices, discrete gates or transistor logic devices, discrete hardware assemblies. The general-purpose processor may be a microprocessor or any regular processor. In addition, the processor 72 may be collectively implemented by integrated circuit chips.

The solution above may reduce the delay time of the storage device to read and improve the read efficiency of the storage device.

Figure 8:
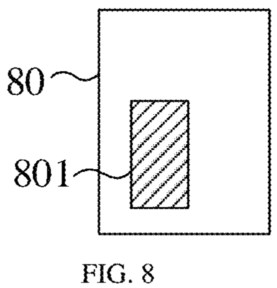
FIG. 8 is a schematic structural view of a computer-readable storage medium according to an embodiment of the present disclosure.

As shown in FIG. 8, FIG. 8 is a schematic structural view of a computer-readable storage medium according to an embodiment of the present disclosure. A computer-readable storage medium 80 stores a program instruction 801 capable of being run by a processor. The program instruction 801 is configured to implement the operations of any one of the methods above.

It should be understood that the methods and devices disclosed in the embodiments provided in the present disclosure may be realized by other means. For example, the device embodiment described above is only schematic. On one hand, a division of modules or units is merely a logical function division, and there may be another division to implement the division of modules or units. Units or assemblies may be combined or integrated into another system, or some features may be ignored or not executed. On the other hand, a coupling, direct coupling, or communication connection between each other shown or discussed may through some interfaces, indirect coupling or communication connection between devices or units may be in electrical, mechanical or other form.

The units described as detached portions may or may not be physically separated, and portions shown as units may or may not be physical units. That is, the units or portions may be located in one place, or may be distributed to network units. Some or all of the units may be selected according to actual demands to achieve the purpose of the embodiments.

In addition, each functional unit in each embodiment of the present disclosure may be integrated in a processing unit, or each unit may physically exist independently, or two or more units may be integrated in a single unit. The integrated units mentioned above may be implemented either in a form of hardware or in a form of software function units.

The integrated unit may be stored in a computer-readable storage medium when the integrated unit is implemented in the form of software function units and sold or used as an independent product. Based on this understanding, the technical solution of the present disclosure in essence or a part contributing to the related art, or all or part of the technical solution may be implemented in a form of a software product. The computer software product is stored in a storage medium and includes a plurality of instructions to enable a computer device (e.g., a personal computer, a server, or a network equipment, and etc.) or a processor to perform all or part of the operations in each embodiment of the present disclosure. The storage medium mentioned above includes a USB flash drive, a mobile hard disk, a read-only memory (ROM), a random access memory (RAM), a magnetic disk or an optical disk, and other medium that can store program code.

The descriptions above are merely embodiments of the present disclosure, and do not limit a protection scope of the present disclosure. Any equivalent structure transformations or equivalent process transformations made according to the specifications and the drawings of the present disclosure, or directly or indirectly apply the specifications and the drawings of the present disclosure to other related technical fields, are all equally included within the protection scope of the present disclosure.

What is claimed is:

1. A soft decoding method, comprising:

performing a hard read on a storage device and performing a hard decoding based on a read data of the hard read;

determining, in response to the hard decoding being failed, a soft-decoding reference data based on the read data of the hard read; and performing a soft decoding based on the soft-decoding reference data;

wherein the performing a hard read on a storage device and performing a hard decoding based on a read data of the hard read comprises:

performing a current hard read on the storage device to obtain a read data of the current hard read; and hard decoding the read data of the current hard read;

the determining, in response to the hard decoding being failed, a soft-decoding reference data based on the read data of the hard read comprises:

counting, in response to a hard decoding of the read data of the current hard read being failed, a preset data in the read data of the current hard read to obtain a target statistical data; and determining, in response to the current hard read being a hard read which is read at an i-th time, the soft-decoding reference data based on the target statistical data, wherein i is a preset number.

2. The soft decoding method according to claim 1, wherein the counting, in response to a hard decoding of the read data of the current hard read being failed, a preset data in the read data of the current hard read to obtain a target statistical data comprises:

performing, in response to the current hard read being not the hard read which is read at the i-th time, a next hard read on the storage device until the hard decoding is successful or the hard read which is read at the i-th time is reached.

3. The soft decoding method according to claim 1, wherein the counting, in response to a hard decoding of the read data of the current hard read being failed, a preset data in the read data of the current hard read to obtain a target statistical data comprises:

counting the preset data in the read data of the current hard read to obtain a current statistical data and counting the current statistical data into a historical statistical data to obtain the target statistical data, wherein the historical statistical data is a comprehensive statistical data of a read data of a historical hard read.

4. The soft decoding method according to claim 3, further comprising:

setting a total number of times of hard read and a read voltage of each hard read; and dividing a voltage of the storage device into a plurality of regions based on the read voltage of each hard read;

wherein the counting the preset data in the read data of the current hard read to obtain a current statistical data and counting the current statistical data into a historical statistical data to obtain the target statistical data comprises:

determining a preset data in a corresponding read data based on a read voltage of the current hard read and counting a preset data in each of the regions to obtain the current statistical data; and counting the current statistical data into the historical statistical data to obtain the target statistical data, wherein the historical statistical data is a statistical data of the preset data in each of the regions in the read data of the historical hard read.

5. The soft decoding method according to claim 4, wherein the preset data comprises at least one of 1 and 0;

the determining a preset data in a corresponding read data based on a read voltage of the current hard read and counting a preset data in each of the regions to obtain the current statistical data comprises:

determining, in response to a voltage of one of the regions being less than the read voltage of the current hard read, a read data corresponding to the one of the regions as 1;

determining, in response to a voltage of one of the regions being greater than the read voltage of the current hard read, a read data corresponding to the one of the regions as 0; and counting at least one of an occurrence number of 1 and an occurrence number of 0 in each of the regions to obtain the current statistical data;

the counting the current statistical data into the historical statistical data to obtain the target statistical data comprises:

adding at least one of an occurrence number of 1 and an occurrence number of 0 in each of the regions of the current hard read and at least one of an occurrence number of 1 and an occurrence number of 0 in each of the regions of the historical hard read respectively to obtain the target statistical data.

6. The soft decoding method according to claim 5, wherein the adding at least one of an occurrence number of 1 and an occurrence number of 0 in each of the regions of the current hard read and at least one of an occurrence number of 1 and an occurrence number of 0 in each of the regions of the historical hard read respectively to obtain the target statistical data comprises:

arranging a counter buffer group, wherein the counting buffer group comprises a buffer unit and at least one counting unit;

overwriting at least one of the occurrence number of 1 and the occurrence number of 0 in each of the regions of the current hard read into the buffer unit; and adding at least one of the occurrence number of 1 and the occurrence number of 0 in each of the regions of the current hard read to at least one of the occurrence number of 1 and the occurrence number of 0 in each of the regions of the historical hard read respectively based on a data in the buffer unit through the counting unit to obtain the target statistical data.

7. The soft decoding method according to claim 5, wherein the determining, in response to the current hard read being a hard read which is read at an i-th time, the soft-decoding reference data based on the target statistical data comprises:

determining a log-likelihood ratio of each of the regions based on at least one of the occurrence number of 1 and the occurrence number of 0 in each of the regions in the target statistical data; and determining the log-likelihood ratio of each of the regions as the soft-decoding reference data.

8. The soft decoding method according to claim 7, wherein the determining a log-likelihood ratio of each of the regions based on at least one of the occurrence number of 1 and the occurrence number of 0 in each of the regions in the target statistical data comprises:

calculating the log-likelihood ratio of each of the regions based on an adjustment parameter, the occurrence number of 1 in each of the regions in the target statistical data, and the occurrence number of 0 in each of the regions in the target statistical data through a preset formula;

wherein the preset formula is $$LLR = \text{scale} * \ln\left(\frac{C_0}{C_1}\right);$$

where LLR is the log-likelihood ratio, scale is the adjustment parameter, $C_0$ is the occurrence number of 0, and $C_1$ is the occurrence number of 1.

9. The soft decoding method according to claim 7, wherein the determining a log-likelihood ratio of each of the regions based on at least one of the occurrence number of 1 and the occurrence number of 0 in each of the regions in the target statistical data comprises:

mapping the occurrence number of 1 or the occurrence number of 0 in each of the regions in the target statistical data to a corresponding log-likelihood ratio based on a preset mapping table;

wherein the preset mapping table is established in advance based on a corresponding relationship between at least one of the occurrence number of 1 and the occurrence number of 0 and the log-likelihood ratio.

10. The soft decoding method according to claim 1, further comprising:

performing an initial hard read on the storage device and performing a hard decoding based on a read data of the initial hard read;

performing, in response to the hard decoding being failed, at least one repeated hard read on the storage device;

wherein the method further comprises at least one of:

determining, in response to a hard decoding of a read data of at least one repeated hard read being failed, the soft-decoding reference data based on the read data of the initial hard read and the read data of the repeated hard read, and performing a soft decoding based on the soft-decoding reference data; and performing, in response to the hard decoding of the read data of at least one repeated hard read being failed, a soft read on the storage device, determining the soft-decoding reference data based on a read data of the soft read, and performing a soft decoding based on the soft-decoding reference data.

11. An electronic device, comprising a storage and a processor coupled to each other, wherein the processor is configured to execute a program instruction stored in the storage to realize a soft decoding method, the method comprises:

performing a hard read on a storage device and performing a hard decoding based on a read data of the hard read;

determining, in response to the hard decoding being failed, a soft-decoding reference data based on the read data of the hard read; and performing a soft decoding based on the soft-decoding reference data;

wherein the performing a hard read on a storage device and performing a hard decoding based on a read data of the hard read comprises:

performing a current hard read on the storage device to obtain a read data of the current hard read; and hard decoding the read data of the current hard read;

the determining, in response to the hard decoding being failed, a soft-decoding reference data based on the read data of the hard read comprises:

counting, in response to a hard decoding of the read data of the current hard read being failed, a preset data in the read data of the current hard read to obtain a target statistical data; and determining, in response to the current hard read being a hard read which is read at an i-th time, the soft-decoding reference data based on the target statistical data, wherein i is a preset number.

12. The electronic device according to claim 10, wherein the counting, in response to a hard decoding of the read data of the current hard read being failed, a preset data in the read data of the current hard read to obtain a target statistical data comprises:

performing, in response to the current hard read being not the hard read which is read at the i-th time, a next hard read on the storage device until the hard decoding is successful or the hard read which is read at the i-th time is reached.

13. The electronic device according to claim 11, wherein the counting, in response to a hard decoding of the read data of the current hard read being failed, a preset data in the read data of the current hard read to obtain a target statistical data comprises:

counting the preset data in the read data of the current hard read to obtain a current statistical data and counting the current statistical data into a historical statistical data to obtain the target statistical data, wherein the historical statistical data is a comprehensive statistical data of a read data of a historical hard read.

14. The electronic device according to claim 13, further comprising:

setting a total number of times of hard read and a read voltage of each hard read; and dividing a voltage of the storage device into a plurality of regions based on the read voltage of each hard read;

wherein the counting the preset data in the read data of the current hard read to obtain a current statistical data and counting the current statistical data into a historical statistical data to obtain the target statistical data comprises:

determining a preset data in a corresponding read data based on a read voltage of the current hard read and counting a preset data in each of the regions to obtain the current statistical data; and counting the current statistical data into the historical statistical data to obtain the target statistical data, wherein the historical statistical data is a statistical data of the preset data in each of the regions in the read data of the historical hard read.

15. The electronic device according to claim 14, wherein the preset data comprises at least one of 1 and 0;

the determining a preset data in a corresponding read data based on a read voltage of the current hard read and counting a preset data in each of the regions to obtain the current statistical data comprises:

determining, in response to a voltage of one of the regions being less than the read voltage of the current hard read, a read data corresponding to the one of the regions as 1;

determining, in response to a voltage of one of the regions being greater than the read voltage of the current hard read, a read data corresponding to the one of the regions as 0; and counting at least one of an occurrence number of 1 and an occurrence number of 0 in each of the regions to obtain the current statistical data;

the counting the current statistical data into the historical statistical data to obtain the target statistical data comprises:

adding at least one of an occurrence number of 1 and an occurrence number of 0 in each of the regions of the current hard read and at least one of an occurrence number of 1 and an occurrence number of 0 in each of the regions of the historical hard read respectively to obtain the target statistical data.

16. The electronic device according to claim 15, wherein the adding at least one of an occurrence number of 1 and an occurrence number of 0 in each of the regions of the current hard read and at least one of an occurrence number of 1 and an occurrence number of 0 in each of the regions of the historical hard read respectively to obtain the target statistical data comprises:

arranging a counter buffer group, wherein the counting buffer group comprises a buffer unit and at least one counting unit;

overwriting at least one of the occurrence number of 1 and the occurrence number of 0 in each of the regions of the current hard read into the buffer unit; and adding at least one of the occurrence number of 1 and the occurrence number of 0 in each of the regions of the current hard read to at least one of the occurrence number of 1 and the occurrence number of 0 in each of the regions of the historical hard read respectively based on a data in the buffer unit through the counting unit to obtain the target statistical data.

17. The electronic device according to claim 15, wherein the determining, in response to the current hard read being a hard read which is read at an i-th time, the soft-decoding reference data based on the target statistical data comprises:

determining a log-likelihood ratio of each of the regions based on at least one of the occurrence number of 1 and the occurrence number of 0 in each of the regions in the target statistical data; and determining the log-likelihood ratio of each of the regions as the soft-decoding reference data.

18. A non-transitory computer-readable storage medium, configured to store a program instruction, wherein the program instruction is executed by a processor to realize a soft decoding method, the method comprises:

performing a hard read on a storage device and performing a hard decoding based on a read data of the hard read;

determining, in response to the hard decoding being failed, a soft-decoding reference data based on the read data of the hard read; and performing a soft decoding based on the soft-decoding reference data;

wherein the performing a hard read on a storage device and performing a hard decoding based on a read data of the hard read comprises:

performing a current hard read on the storage device to obtain a read data of the current hard read; and hard decoding the read data of the current hard read;

the determining, in response to the hard decoding being failed, a soft-decoding reference data based on the read data of the hard read comprises:

counting, in response to a hard decoding of the read data of the current hard read being failed, a preset data in the read data of the current hard read to obtain a target statistical data; and determining, in response to the current hard read being a hard read which is read at an i-th time, the soft-decoding reference data based on the target statistical data, wherein i is a preset number.

* * * * *